UNITED STATES PATENT OFFICE.

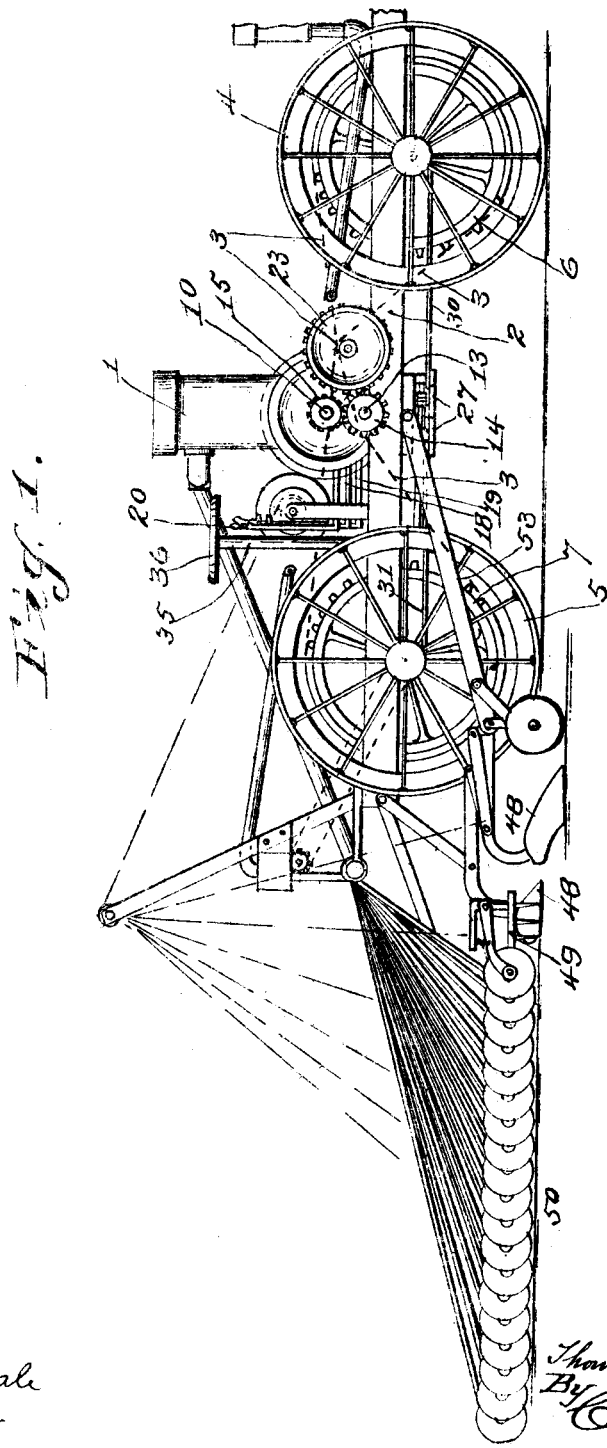

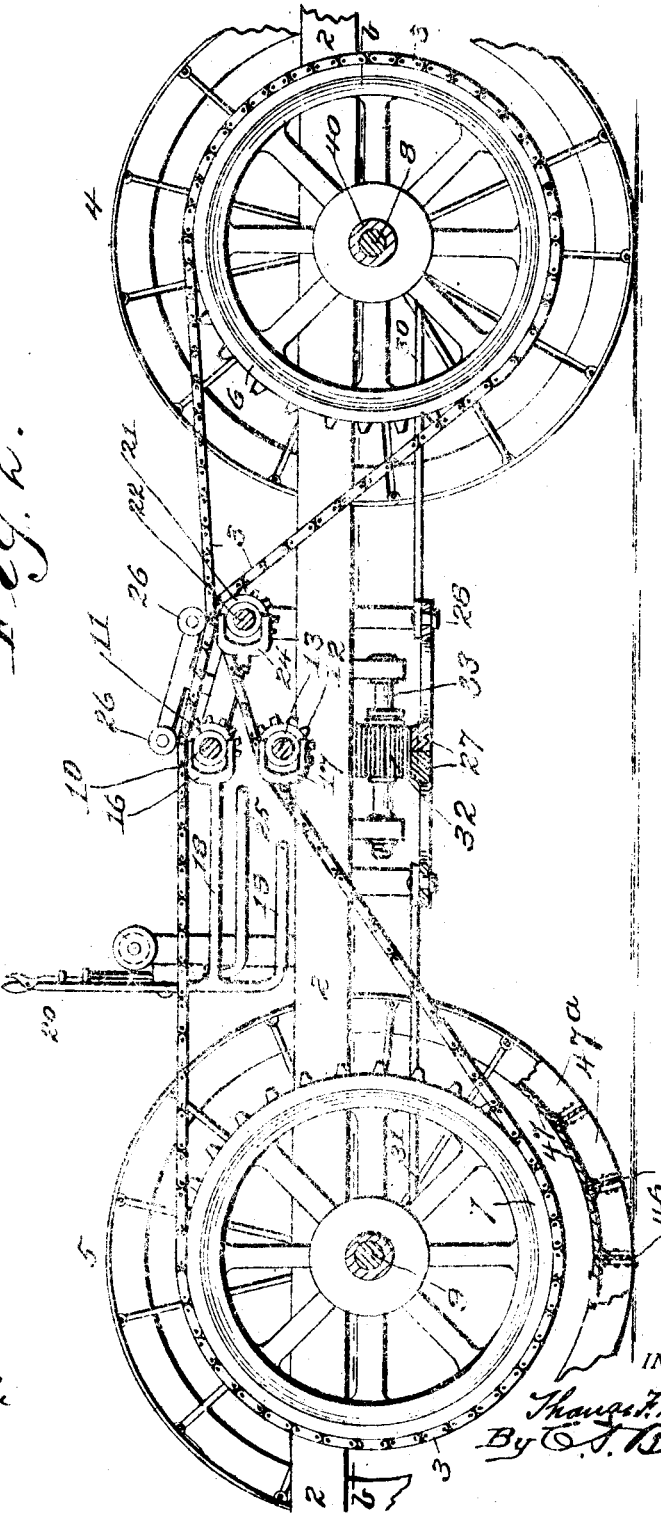

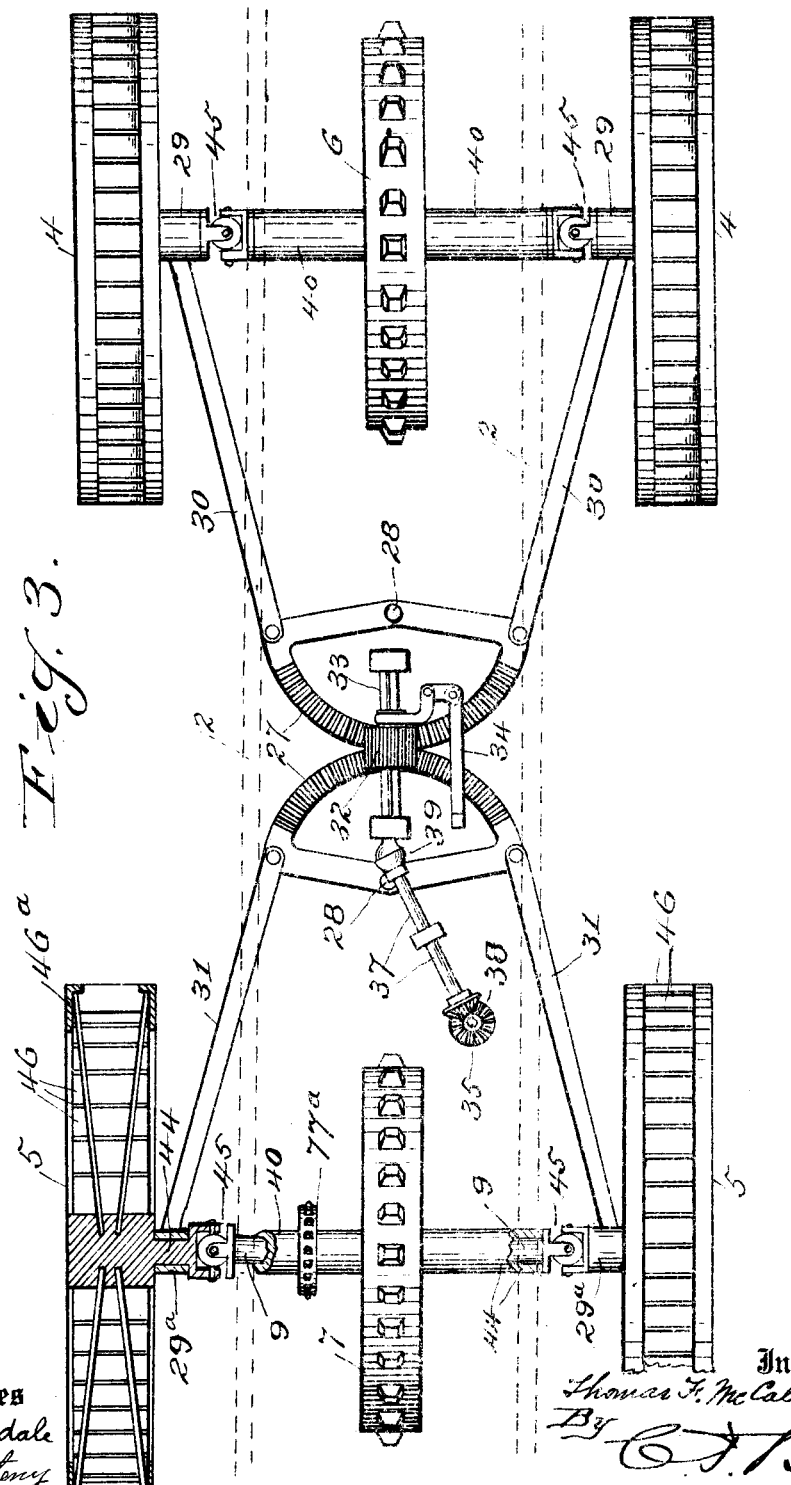

THOMAS F. McCALLISTER, OF PRINEVILLE, OREGON.

MOTOR-VEHICLE.

1,080,361.  Specification of Letters Patent.  Patented Dec. 2, 1913.

Application filed July 27, 1912. Serial No. 711,814.

*To all whom it may concern:*

Be it known that I, THOMAS F. MCCALLISTER, a citizen of the United States, residing at Prineville, in the county of Crook and State of Oregon, have invented certain new and useful Improvements in Motor-Vehicles, of which the following is a specification.

This invention relates to motor vehicles, and pertains especially to four-wheel drive vehicles particularly adaptable for farm use.

The prime object of my invention is to provide a motor vehicle of such special and particular construction and arrangement of parts as to afford means for attaching thereto or connecting therewith one or more agricultural machines, and as to afford unusual power for propelling the vehicle and such machine or machines as may be attached thereto, A further object of the invention is to provide certain driving mechanism in a four-wheel motor vehicle, special steering mechanism, and special connections between said driving mechanism and said steering mechanism, for the purpose of expeditiously combining and operating the same by or through the operation of the vehicle and while the latter is propelled.

A still further object of the invention is to provide novel and peculiar means for operating an endless drive chain during its driving operation to reverse the drive and to change or vary the speed or driving power of the chain as desired.

A still further object of the invention is to provide certain details of novel and peculiar construction in the various parts and their connections as will be hereinafter fully described.

Various other objects, advantages and improved results will be found in the practical application of the invention.

In the accompanying drawings forming part of this application: Figure 1 is a side elevation of the machine showing cultivators attached thereto and operated thereby. Fig. 2 is an enlarged sectional view. Fig. 3 is a longitudinal sectional view.

The same reference characters denote the same parts throughout the several views of the drawings.

The motor vehicle shown in the drawings and hereinafter to be particularly described, has an engine 1 mounted on the bed 2, for operating an endless drive chain 3, which drives the front and rear wheels 4 and 5, respectively, of the vehicle through the medium of front and rear sprocket wheels 6 and 7 centrally mounted, respectively, on the front axle 8 and the rear axle 9 of the vehicle. Said axles being sectional. The engine shaft 10 is provided with a sprocket wheel 11 for the chain 3, and a like sprocket wheel 12 for the chain is mounted on a shaft 13, provided with a gear 14 and meshing with a gear 15 on the engine shaft 10. The chain passes over the sprocket wheel 11 and over the sprocket wheel 12, whereby the chain is driven for forward movement of the vehicle by the sprockets 11 and 12 so that there is a double drive of the chain between the said sprocket wheels 11 and 12 and the traction-wheel sprockets 6 and 7. The said sprockets 11 and 12 are thrown in and out of chain driving position by clutches 16 and 17 operated by clutch levers 18 and 19 respectively, and said levers are operated by a hand lever 20.

One of the more important features of my invention is the means for automatically reversing and changing the speed of the vehicle and the driving power of the traction wheels. This I accomplish by a pair of sprocket wheels 21, mounted on a shaft 22, having a gear wheel 23 meshing with the gear wheel 14. The sprockets 21 are coupled and uncoupled with the shaft 22, by means of a pair of clutches 24, operated by clutch levers 25. The chain 3 passes from the sprocket 11 to one of the sprockets 21 thence over the sprocket wheel on the front axle, then back to and over the other of the sprockets 21, thence over the sprocket 12, and around the sprocket wheel of the rear axle. Guide sheaves or rollers 26 keep the chain 3 in mesh with the sprockets 11 and 21. It is obvious that the vehicle is propelled forward by the sprockets 11 and 12 operating the chain 3, that the movement of the vehicle is reversed by operating the clutches 24, and that the vehicle is propelled backwardly by the sprockets 21. The said operations being automatic and simultaneous.

The steering mechanism comprises a pair of toothed segments or racks 27 slidably mounted on the under side of the bed 2, for pivot movement on pivots 28. The ends of one segment are connected with the front spindle skein 29 by levers 30, and the ends of the other segment are connected with the rear spindle skeins 29ᵃ by levers 31; a pinion 32 is slidably keyed to a shaft 33, for meshing with the segments and the pinion is operated by a lever 34 to slide the pinion into mesh with one or the other of the segments as desired; the shaft 33 is operated by a stand-shaft 35 having a hand wheel 36 and connected with a shaft 37 by gears 38, and the shaft 37 is connected with the shaft 33 by means of a universal joint 39. The axles have a skein or casing 40, and the axles are connected with the wheel spindles 44 by universal couplings 45.

The traction wheels 4 and 5 are all of the same construction, therefore only one of them will be described in detail. Such wheel has a series of cross-plates 46 secured to and between the wheel-rims 46ª, and these plates are braced apart by brace plates 47 so as to form pockets 47ª. The object of this particular wheel construction is to furnish a wheel tread which will enter the earth or ground and thus avoid packing the earth and slipping of the wheel.

The vehicle being especially adapted for operating agricultural machines, I have shown a gang-plow 48, a harrow 49, and a gang of grain drill disks 50 connected with the vehicle.

Although I have shown and described the motor vehicle in connection with and for operating certain agricultural machines or implements, it must be understood that I do not limit or confine myself to any particular use or application of the vehicle, nor to the number or character of machines to which the vehicle is applicable for operating them. Neither do I wish to be understood as restricting the invention to any particular size, shape or material in the construction thereof, or in constructions therewith, nor to the particular details employed therein, but reserve to myself the right to make such application of the vehicle as may be found possible or desirable, and to use such mechanical equivalents in the manufacture of the vehicle and the various parts thereof, and in means for connecting it with various machines as may be found expedient, without departing from the scope of the appended claims.

Having thus described my invention what I claim as new and desire to secure by Letters Patent is:—

1. In a motor vehicle, the combination of two pairs of traction wheels, a sectional axle for each pair of said wheels, a bed carried by the axles, a power-supplying element mounted on the bed, a sprocket wheel central of each axle, an endless chain for the sprocket wheels, a pair of vertically alined sprocket wheels operated by the power-supplying element in engagement with said chain, and power-transmitting means from one to the other of the said pair of sprocket wheels.

2. In a motor vehicle, the combination of two pairs of traction wheels, a sectional axle for each pair of said wheels, a bed carried by the axles, a sprocket wheel central of each axle and working through the bed, an engine mounted on the bed, a driven shaft projecting from the engine, a pair of vertically alined sprocket wheels one of which is secured to the engine shaft, means for transmitting power from said shaft to the other of the pair of sprocket wheels, and an endless chain connecting the axle-sprocket wheels and driven by the said pair of sprocket wheels.

3. In a motor vehicle, the combination of two pairs of traction wheels, a sectional axle for each pair of said wheels, a bed carried by the axles, a sprocket wheel central of each axle and working through the bed, an engine mounted on the bed, a driven shaft projecting from the engine, a pair of vertically alined sprocket wheels one of which is secured to the engine shaft, means for transmitting power from said shaft to the other of the pair of sprocket wheels, an endless chain connecting the axle-sprocket wheels and driven in one direction by the said pair of sprocket wheels, a reversing shaft operated by the said power transmitting means, a pair of sprocket wheels on the reversing shaft for driving the chain in the other direction, and means for coupling and uncoupling the reversing shaft with the sprocket wheels thereof.

In witness whereof I hereunto set my hand in the presence of two witnesses.

THOMAS F. McCALLISTER.

Witnesses:
   C. T. BELT,
   R. F. LANSDALE.